(12) United States Patent
Nishimura

(10) Patent No.: US 10,976,403 B2
(45) Date of Patent: Apr. 13, 2021

(54) POSITION DETECTION SYSTEM AND RECEIVER

(71) Applicant: Murata Manufacturing Co., Ltd., Kyoto (JP)

(72) Inventor: Tetsu Nishimura, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 160 days.

(21) Appl. No.: 16/223,741

(22) Filed: Dec. 18, 2018

(65) Prior Publication Data
US 2019/0120927 A1 Apr. 25, 2019

Related U.S. Application Data

(63) Continuation of application No. PCT/JP2017/022934, filed on Jun. 21, 2017.

(30) Foreign Application Priority Data
Jul. 4, 2016 (JP) .............................. JP2016-132790

(51) Int. Cl.
*G01S 5/02* (2010.01)
*H04W 84/22* (2009.01)

(52) U.S. Cl.
CPC ...... *G01S 5/02216* (2020.05); *G01S 5/02213* (2020.05); *H04W 84/22* (2013.01); *G01S 2205/02* (2020.05)

(58) Field of Classification Search
CPC ...... G01S 5/02; G01S 5/0221; G01S 5/02213; G01S 5/02216; G01S 2205/02; H04W 84/22
See application file for complete search history.

(56) References Cited

U.S. PATENT DOCUMENTS

| 2003/0085839 A1* | 5/2003 | Zhodzishky | ............ G01S 19/44 342/357.31 |
| 2011/0188389 A1* | 8/2011 | Hedley | ................. G01S 5/0215 370/252 |

(Continued)

FOREIGN PATENT DOCUMENTS

| JP | H07-245579 A | 9/1995 |
| JP | H08-204421 A | 8/1996 |

(Continued)

OTHER PUBLICATIONS

International Search Report for International Application No. PCT/JP2017/022934 dated Sep. 19, 2017.

(Continued)

*Primary Examiner* — Bernarr E Gregory
*Assistant Examiner* — Fred H Mull
(74) *Attorney, Agent, or Firm* — Pearne & Gordon LLP

(57) ABSTRACT

A position detection system (10) includes receivers (20a to 20g) constituting a radio mesh network, and a gateway device (30). Each of the receivers (20a to 20g) includes a receiving unit (22), a sending unit (23), and a control unit (24). When the receiving unit (22) in each of the receivers (20a to 20f) receives the beacon, the control unit (24) generates first reception information containing information indicating signal strength of the received beacon and identification information of the relevant receiver, and sends the first reception information from the sending unit (23). When the receiving unit (22) receives second reception information, the control unit (24) sends the second reception information. When receiving the second reception information generated by the other receiver, the receiver (20g) connected to the gateway device (30) sends the received second reception information to the server device (34) through the gateway device (30).

12 Claims, 8 Drawing Sheets

(56) References Cited

U.S. PATENT DOCUMENTS

2015/0071163 A1 3/2015 Mackie
2016/0349353 A1 12/2016 Wang et al.

FOREIGN PATENT DOCUMENTS

| JP | H08-307927 A | 11/1996 |
|---|---|---|
| JP | H11-252622 A | 9/1999 |
| JP | 3020516 B2 | 3/2000 |
| JP | 2001-313972 A | 11/2001 |
| JP | 3587448 B2 | 11/2004 |
| JP | 2005-210656 A | 8/2005 |
| JP | 2008-219084 A | 9/2008 |
| JP | 2012-173070 A | 9/2012 |
| JP | 2012-251959 A | 12/2012 |
| WO | 2015/118135 A1 | 8/2015 |

OTHER PUBLICATIONS

Written Opinion for International Application No. PCT/JP2017/022934 dated Sep. 19, 2017.
English translation of Tetsuo Tsujioka et al., "Experimental Study on Outdoor Positioning in 920 MHz Wireless Networks", Proceedings of the 37th Symposium on Information Theory and its Applications (SITA2014), Dec. 2014, pp. 383-388.
English translation of Ayaka Ito, "Kiki Hito no Shozai Kenchi de Iryo no Anzen Anshin o Support", Gekkan Jido Ninshiki, Dec. 2013, pp. 27-32, vol. 26, No. 14.

* cited by examiner

POSITION DETECTION SYSTEM AND RECEIVER

This is a continuation of International Application No. PCT/JP2017/022934 filed on Jun. 21, 2017 which claims priority from Japanese Patent Application No. 2016-132790 filed on Jul. 4, 2016. The contents of these applications are incorporated herein by reference in their entireties.

BACKGROUND OF THE DISCLOSURE

Field of the Disclosure

The present disclosure relates to a position detection system for detecting a position of a moving object, and to a receiver constituting the position detection system.

Description of the Related Art

Hitherto, various techniques have been proposed as position detection systems for detecting the positions of moving objects (see, for example, Patent Document 1).

Patent Document 1 discloses a position detection system utilizing RFID (Radio Frequency IDentification) in which an RF tag sending a beacon repeatedly is attached to a moving object and receivers are arranged at a plurality of positions (known positions) in a moving space. When the receivers receive the beacon sent from the RF tag attached to the moving object, each receiver measures an RSSI (Received Signal Strength Indication), etc. of the received beacon and sends the measurement information indicating the measured results to a position detection unit via a transmission path. The position detection unit selects the maximum one among the signal strengths indicated by the measurement information sent from the receivers, and determines that the moving object exists near the receiver corresponding to the selected signal strength. Thus, the position of the moving object is detected.

Patent Document 1: Japanese Patent No. 3587448

BRIEF SUMMARY OF THE DISCLOSURE

In the position detection system disclosed in Patent Document 1, however, the receivers need to be connected to the position detection unit via the transmission paths. Accordingly, when the transmission paths are constituted by communication cables, the communication cables are required in number corresponding to the number of receivers, and laying the communication cables is complicated. When the transmission paths are constituted using radio, the moving space is limited to a narrow area due to the restrictions imposed by a radio-reachable communication range.

Moreover, because of requiring the independent transmission paths for the receivers, the position detection system disclosed in Patent Document 1 has a difficulty in system extension such as increasing the number of receivers.

In consideration of the above-described problems, an object of the present disclosure is to provide a position detection system and a receiver, the system being able to suppress a drawback such as the complication in laying the communication cables, and being easily extensible.

To achieve the above object, according to one aspect of the present disclosure, there is provided a position detection system sending, to a server device, information to detect a position of a moving object that sends a beacon repeatedly, the position detection system including a plurality of receivers constituting a radio mesh network, and a gateway device connected to one of the receivers and communicating with the server device, each of the receivers including a receiving unit that receives the beacon and a radio signal sent from any other receiver, a sending unit that sends a radio signal to any other receiver, and a control unit that controls the receiving unit and the sending unit, wherein, when the receiving unit in each of the receivers except for the receiver connected to the gateway device receives the beacon, the control unit generates first reception information containing information indicating signal strength of the received beacon and identification information of the relevant receiver, and sends the first reception information from the sending unit, and when the receiving unit receives second reception information containing information indicating signal strength of the beacon received by the other receiver and identification information of the other receiver, the control unit sends the received second reception information from the sending unit, and when receiving the second reception information generated by the other receiver, the receiver connected to the gateway device sends the received second reception information to the server device through the gateway device.

With those features, the receivers constitute the radio mesh network, and the first reception information sent from each of the receivers is delivered to the server device through the gateway device after being, for example, relayed in the radio mesh network. Accordingly, the necessity of connecting all the receivers and the server device via transmission paths does no longer exist, thus making it possible to reduce the drawbacks that laying of communication cables is complicated, a moving space is limited to a narrow range, and the extension such as increasing the number of receiver is difficult to realize.

In the above position detection system, when the receiving unit receives the beacon, the control unit may send, from the sending unit, the first reception information after the lapse of a waiting time that is set to be longer as the received beacon has lower signal strength, and when the second reception information is received from the other receiver during the lapse of the waiting time after receiving the beacon, the control unit may stop sending of the first reception information.

With those features, the first reception information is successively sent from the receiver having received the beacon with the maximum signal strength, and the receiver having received the beacon with lower signal strength receives the second reception information from the other receiver before sending the first reception information. Accordingly, the reception information related to the lower signal strength is avoided from being transmitted in the radio mesh network, and the congestion of the packets carrying the reception information in the radio mesh network is suppressed.

The control unit may compare, during the waiting time, first signal strength of the beacon received by the receiving unit with second signal strength indicated by information contained in the second reception information, and stop the sending of the first reception information if the second signal strength is higher than the first signal strength.

With that feature, when the second reception information is received from the other receiver, the sending of the first reception information is stopped after comparing the signal strength of the beacon. As a result, even when there are variations among processing times and waiting times in the individual receivers, the reception information related to lower signal strength can be more reliably suppressed from being transmitted in the radio mesh network The moving object may send the beacon containing a sequence number that is updated whenever the moving object sends the beacon, and the control unit may send, when sending the first reception information, the first reception information added with the sequence number from the sending unit, and compare, when comparing the first signal strength and the second signal strength, the signal strengths of the beacons having the same sequence number.

With those features, the comparison of the signal strength is performed for the beacon sent from the same moving object at the same timing. Accordingly, even when a larger number of moving objects are present or a moving speed of the moving object is comparatively high, only the reception information related to higher signal strength is delivered to the server device through the gateway device per beacon sent from one moving object. Hence accurate position detection is realized.

The moving object may send the beacon periodically, and the control unit may determine the waiting time corresponding to the signal strength such that a maximum value of the waiting time is smaller than a period of the beacon sent from the moving object.

With those features, since the maximum value of the waiting time is smaller than the beacon sending period, the receiver is avoided from receiving the next beacon from the same moving object while it is in a waiting period until sending of the first reception information. As a result, the complication of the processing is avoided from occurring due to the fact that the determination regarding whether to send the first reception information for each of the plural beacons is accumulated in the waiting time.

The control unit may compare the first signal strength and the second signal strength for each of a predetermined plural number of other receivers, and stop the sending of the first reception information if the second signal strength is higher than the first signal strength for all the predetermined plural number of other receivers. Alternatively, when the second reception information is received from the plurality of other receivers, the control unit may stop the sending of the first reception information if, in an assembly of the signal strengths including the first signal strength and the second signal strength contained in the second reception information received from each of the plurality of other receivers, the first signal strength does not fall within a predetermined order from maximum signal strength.

With those features, since the sending of the reception information related to the relevant receiver is suppressed if the signal strengths contained in the reception information received from the predetermined plural number of other receivers are higher than the signal strength related to the relevant receiver, only the reception information sent from the predetermined plural number of receivers having received the beacons with the signal strengths higher than a certain level are delivered to the server device. Alternatively, when the second reception information is received from each of the plurality of other receivers, the sending of the first reception information related to the relevant receiver is suppressed if the first signal strength does not fall within the predetermined order from the maximum signal strength. Therefore, only the reception information sent from the plurality of receivers having received the beacons with the signal strengths higher than a certain level are delivered to the server device. Hence the server device can perform the position detection using the reception information delivered from the predetermined plural number of receivers (by a sophisticated method such as three-point positioning).

The control unit may estimate, from the second reception information received from any other receiver before, third signal strength of the beacon to be next received by the other receiver, compare the estimated third signal strength with the first signal strength of the beacon received by the receiving unit, and stop the sending of the first reception information if the third signal strength is higher than the first signal strength.

With that feature, in each of the receivers, whether to send the first reception information is determined by comparing the estimated signal strength related to the other receiver with the signal strength related to the relevant receiver without setting the waiting time. Accordingly, the reception information from the receiver is delivered to the server device in a shorter time after sending of the beacon from the moving object. Hence the latency in the position detection and update can be reduced.

The control unit may estimate, from the third signal strength estimated before, fourth signal strength of the beacon to be next received by the other receiver, compare the estimated fourth signal strength with the first signal strength, and stop the sending of the first reception information if the fourth signal strength is higher than the first signal strength.

With that feature, regarding the signal strength in the other receiver, further signal strength is estimated on the basis of the estimated signal strength. As a result, in each receiver, whether to send the first reception information can be properly determined even when the reception information cannot be received from the other receiver for some reason such as radio wave interference.

When estimating the signal strength, the control unit may estimate the signal strength to be lower than the latest signal strength.

With that feature, for the other receiver, the signal strength is estimated to be lower than the latest signal strength. It is hence possible to avoid a situation that the sending of the first reception information is continuously stopped because high signal strength is estimated in spite of the other receiver not receiving the beacon.

The receiver connected to the gateway device may generate, when the receiving unit receives the beacon, first reception information that contains information indicating signal strength of the received beacon and identification information of the relevant receiver, and send the first reception information from the sending unit.

Thus, insofar as at least one among the plurality of receivers is connected to the gateway device, the other one or more receivers may also be connected to the gateway device, or may include a communication interface (sending unit and receiving unit) for connection to the gateway device.

To achieve the above object, a receiver according to another aspect of the present disclosure is one of the receivers in the above position detection system.

With that feature, the position detection system free from the necessity of connecting all the receivers and the server device via transmission paths can be realized by preparing the above receiver in plural number and constituting a radio mesh network.

The present disclosure can realize the position detection system and the receiver, that system being able to suppress a drawback such as the complication in laying the communication cables, and being easily extensible.

Figure 12A:
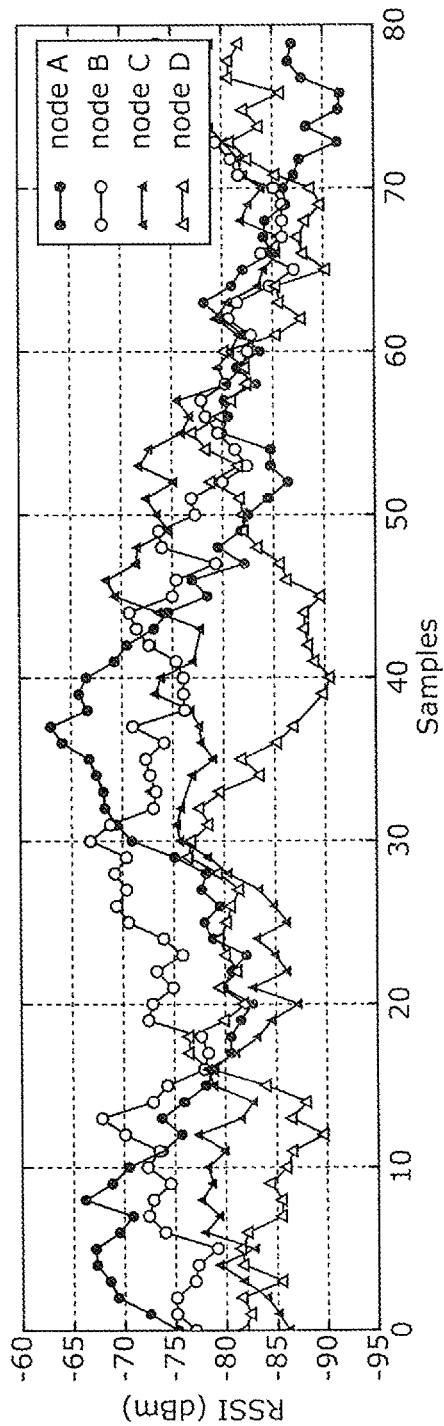
Figure 12B:
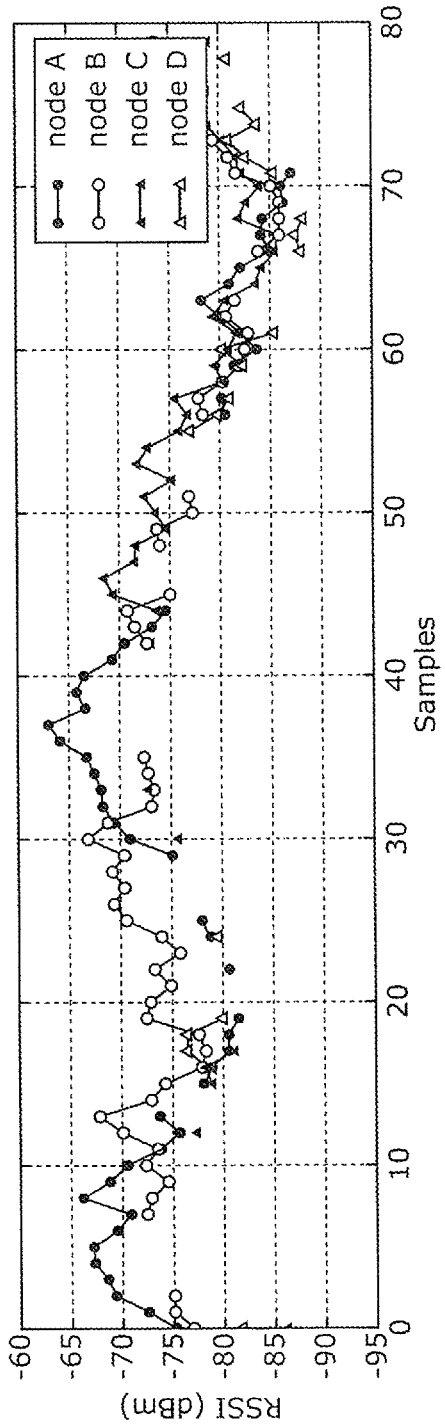

Each of FIGS. 12A and 12B illustrates an example in which the packet congestion is reduced in the position detection system according to Modification 6 of the embodiment.

Figure 13:
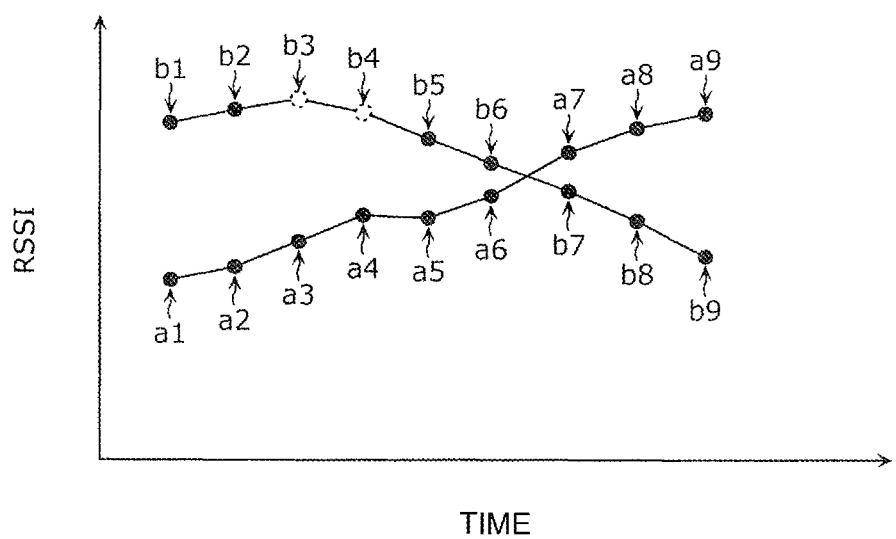

FIG. 13 is a communication sequence chart illustrating the operations of the receivers in Modification 7 of the embodiment.

Figure 14:
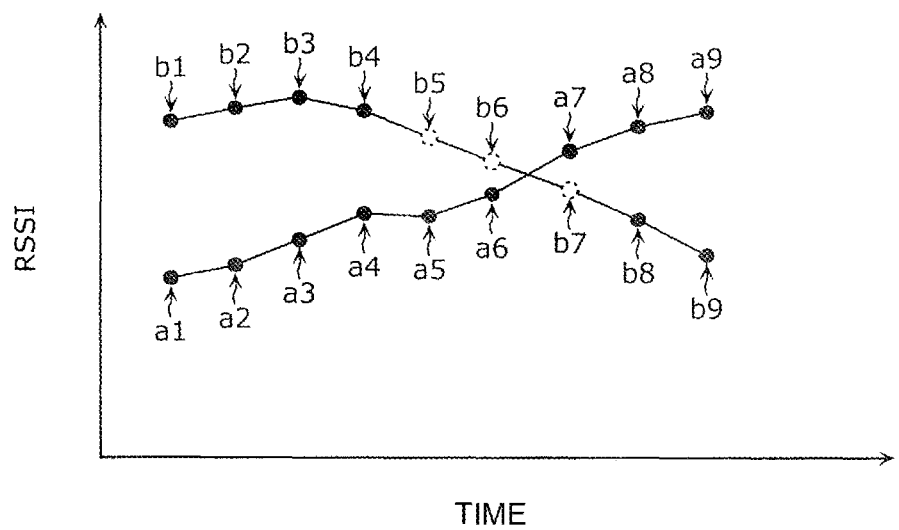

FIG. 14 is a communication sequence chart illustrating the operations of the receivers in Modification 8 of the embodiment.

DETAILED DESCRIPTION OF THE DISCLOSURE

Embodiments of the present disclosure will be described in detail below with reference to the drawings. It is to be noted that any of the following embodiments represents a specific example. Numerical values, shapes, materials, constituent elements, arrangements and connection forms of the constituent elements, steps, sequences of the steps, etc., which are described in the following embodiments, are merely illustrative, and they are not purported to limit the scope of the present disclosure. Among the constituent elements in the following embodiments, those ones not stated in independent Claims representing the most significant concept of the present disclosure are explained as optional constituent elements.

Figure 1:
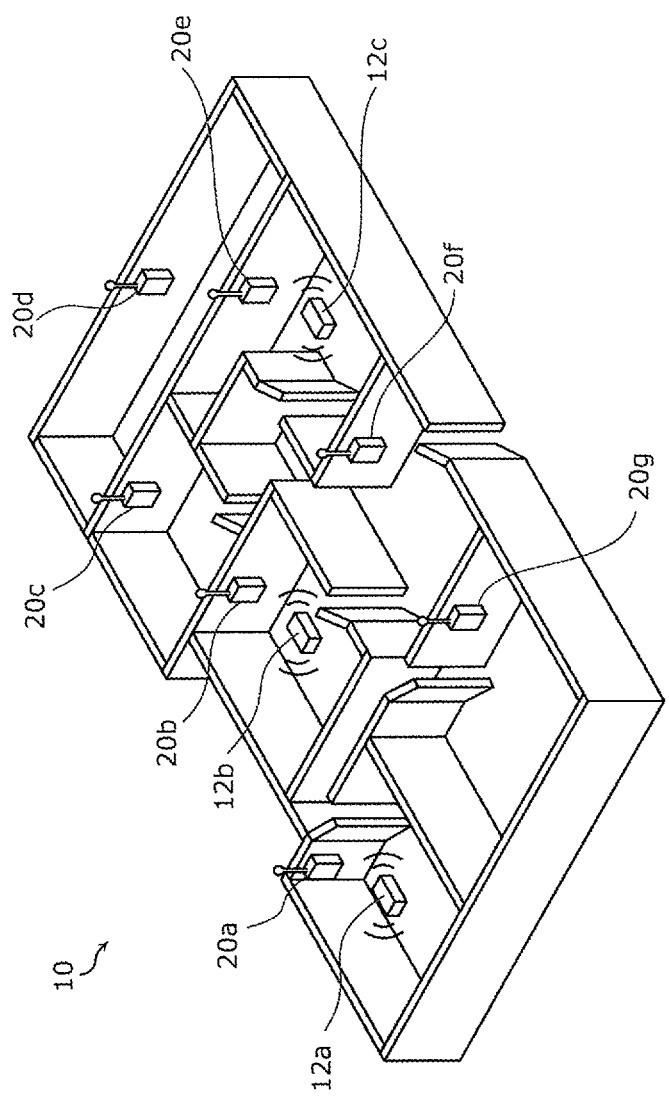
FIG. 1 illustrates an installation example of a position detection system according to an embodiment.

FIG. 1 illustrates an installation example of a position detection system 10 according to an embodiment. In the illustrated example, a plurality (here 7) of receivers 20a to 20g constituting the position detection system 10 are mounted to the walls of different rooms. FIG. 1 further illustrates a moving object (here three moving objects 12a to 12c), i.e., a position detection target.

The position detection system 10 is a system sending, to a server device (not illustrated), the information to detect the positions of the moving objects 12a to 12c each of which sends a beacon repeatedly. The position detection system 10 implements, for example, asset tracking to perform the distribution management and material management using RFID.

The receivers 20a to 20g are nodes constituting a radio mesh network, and serve as fixed stations adapted for BLE (Bluetooth (registered trademark) Low Energy). The radio mesh network is one form of an ad-hoc network needing no access points, and each of the nodes (receivers 20a to 20g) constituting the radio mesh network performs traffic transfer (called also "hop"). One (here receiver 20g) among the receivers 20a to 20g is connected to a gateway device (not illustrated) communicating with a server device (illustrated) as described later, and it may not have the traffic transfer function.

Each of the moving objects 12a to 12c is a moving object sending a beacon repeatedly, such as a thing or a person equipped with an RF tag sending the beacon. Although FIG. 1 illustrates three moving objects 12a to 12c, the number of moving objects, i.e., the position detection targets of the position detection system 10, may be any value of one or more.

Figure 2:
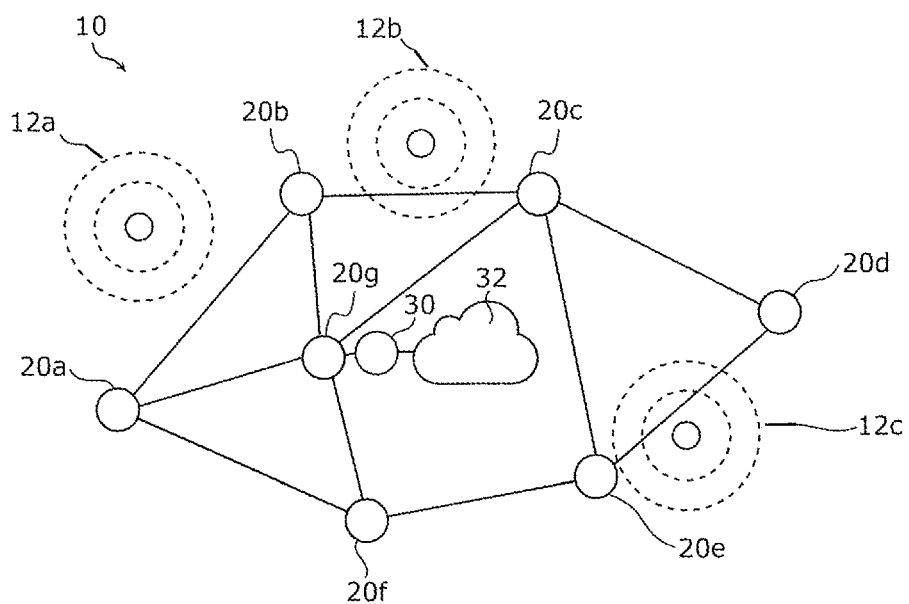
FIG. 2 illustrates a connection example using a radio mesh network in the position detection system illustrated in FIG. 1.

FIG. 2 illustrates a connection example using a radio mesh network in the position detection system 10 illustrated in FIG. 1. FIG. 2 further illustrates the moving objects 12a to 12c illustrated in FIG. 1.

Figure 3:
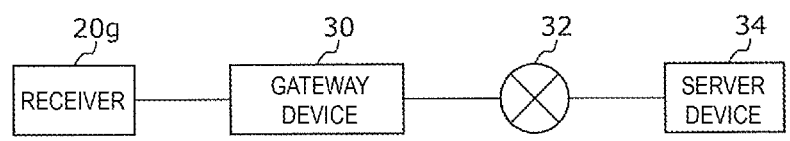
FIG. 3 illustrates a connection relation among one of the receivers illustrated in FIG. 1, a gateway device, and a server device.

One (here receiver 20g) among the receivers 20a to 20g is connected, as illustrated in a connection diagram of FIG. 3, to a gateway device 30 communicating with a server device 34 via a communication network 32 such as the Internet.

The gateway device 30 is a communication device connecting the radio mesh network and the communication network 32 such as the Internet, and is a broadband radio router, for example.

When the beacons sent from the moving objects 12a to 12c are received by any of the receivers 20a to 20g constituting the radio mesh network, the reception information is issued from the receiver 20 having received the beacon, and the reception information is delivered to the receiver 20g after being relayed in the radio mesh network. The reception information represents the information containing the signal strength of the received beacon (here RSSI) and the identification information of the relevant receiver. Furthermore, the receivers 20a to 20g transfer the reception information in such a way that the reception information is transmitted between two receivers from one to the other (i.e., only in one direction) (namely, the receiver having received the reception information does not return (send back) that reception information to a transmission source of the reception information).

When the above-mentioned reception information arrives at the receiver 20g, the receiver 20g transfers the reception information to the gateway device 30 and the server device 34 via the communication network 32. The server device 34 having received the reception information detects the positions of the moving objects 12a to 12c using the signal strength and the identification information of each receiver, which are contained in the reception information. For instance, the server device 34 performs the position detection on the basis of the identification information of each receiver contained in the reception information, such as detecting that the moving object exists near some receiver, or that the moving object exists within a range surrounded by the plurality of receivers. At that time, by using the signal strength contained in the reception information, the server device 34 estimates how far the moving object exists from the receiver, or selects one or more among the data of the reception information, which are to be used in the position detection (for example, selects only the reception information related to the signal strength of a certain value or higher).

Although the gateway device 30 is connected to the receiver 20g in FIG. 2, the receiver 20g may incorporate the gateway function instead. Alternatively, a gateway device for communicating with the server device 34 may be connected to plural receivers.

Figure 4:
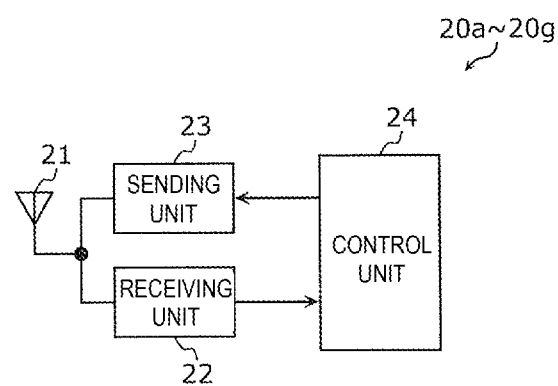
FIG. 4 is a block diagram illustrating a configuration of each receiver illustrated in FIG. 1.

FIG. 4 is a block diagram illustrating a configuration of each of the receivers 20a to 20g illustrated in FIG. 1.

Each of the receivers 20a to 20g includes an antenna 21, a receiving unit 22, a sending unit 23, and a control unit 24 (a controller). Collectively, the antenna 21, receiving unit 22, and sending unit 23, may be part of a transceiver, or separately embodied as a radio receiver and a radio transmitter.

The antenna 21 is used to send and receive the radio signals to and from the other receivers, and to receive the beacons sent from the moving objects 12a to 12c. The antenna 21 is, for example, a whip antenna or a pattern antenna.

The receiving unit 22 is a receiving circuit that receives the beacons sent from the moving objects 12a to 12c, and the radio signals sent from the other receivers. The receiving unit 22 is constituted, for example, by a bandpass filter, an amplifier, a demodulator, etc.

The sending unit 23 is a sending circuit that sends the radio signals to the other receivers, and is constituted, for example, by a modulator, an amplifier, a bandpass filter, etc.

The control unit 24 is a circuit controlling the receiving unit 22 and the sending unit 23, and is, for example, a microcomputer (or a microcontroller) including ROM storing programs, RAM temporarily holding data, processor executing programs, a timer, input/output ports, etc. The control unit 24 holds the identification information for identifying the receiver in which the control unit 24 is incorporated (i.e., the unique identification information in the position detection system 10).

In more detail, when the receiving unit 22 in each of the receivers 20a to 20f except for the receiver connected to the gateway device 30 receives the beacon, the control unit 24 generates the reception information containing the information indicating the signal strength of the received beacon and the identification information of the relevant receiver (the reception information issued from the relevant receiver being called "first reception information" hereinafter), and sends the generated reception information from the sending unit 23.

Furthermore, when the receiving unit 22 in each of the receivers 20a to 20f receives the reception information containing the information indicating the signal strength of the beacon received by the other receiver and the identification information of the other receiver (the reception information issued from the other receiver being called "second reception information" hereinafter), the control unit 24 sends (transfers) the received second reception information from the sending unit 23.

On the other hand, when receiving the second reception information generated by the other receiver, the control unit 24 in the receiver 20g connected to the gateway device 30 sends (transfers) the received second reception information to the server device 34 through the gateway device 30. The control unit 24 in the receiver 20g may generate the first reception information and send the generated first reception information to the server device 34 through the gateway device 30 when the receiving unit 22 receives the beacon. Alternatively, the receiver 20g connected to the gateway device 30 may generate the first reception information and send the generated first reception information from the sending unit 23 when the receiving unit 22 receives the beacon.

With the above-described position detection system 10 according to this embodiment, when the beacons sent from the moving objects 12a to 12c are each received by any of the receivers 20a to 20g constituting the radio mesh network, the reception information is issued from the receiver having received the beacon and is delivered to the receiver 20g after being relayed in the radio mesh network. The reception information having been delivered to the receiver 20g is transferred from the receiver 20g to the gateway device 30 and the server device 34 via the communication network 32. In the server device 34, the positions of the moving objects 12a to 12c are detected on the basis of the signal strength and the identification information of each receiver, which are contained in the reception information having been received.

Thus, the position detection system 10 according to this embodiment is a system sending, to the server device 34, the information to detect the positions of the moving objects 12a to 12c each of which sends the beacon repeatedly, the system including the receivers 20a to 20g constituting the radio mesh network, and the gateway device 30 connected to one of the receivers 20a to 20g and communicating with the server device 34. Each of the receivers 20a to 20g includes the receiving unit 22 that receives the beacon and a radio signal sent from any other receiver, the sending unit 23 that sends a radio signal to any other receiver, and the control unit 24 that controls the receiving unit 22 and the sending unit 23. When the receiving unit 22 in each of the receivers 20a to 20f except for the receiver 20g connected to the gateway device 30 receives the beacon, the control unit 24 generates the first reception information containing the information indicating the signal strength of the received beacon and the identification information of the relevant receiver, and sends the generated first reception information from the sending unit 23, and when the receiving unit 22 receives the second reception information containing the information indicating the signal strength of the beacon received by the other receiver and the identification information of the other receiver, the control unit 24 sends (transfers) the received second reception information from the sending unit 23. When receiving the second reception information generated by the other receiver, the control unit 24 in the receiver 20g connected to the gateway device 30 sends (transfers) the received second reception information to the server device 34 through the gateway device 30.

As described above, the receivers 20a to 20g constitute the radio mesh network, and the first reception information sent from each of the receivers 20a to 20g is delivered to the server device 34 through the gateway device 30 after being, for example, relayed in the radio mesh network. Accordingly, the necessity of connecting all the receivers 20a to 20g constituting the position detection system 10 and the server device 34 via the transmission paths does no longer exist, and the drawbacks in the related-art position detection system are reduced. In other words, it is possible to reduce the drawbacks that laying of the communication cables is complicated, a moving space is limited to a narrow range, and the extension such as increasing the number of receiver is difficult to realize.

In the position detection system 10 according to the above embodiment, one packet issued from one receiver may be transmitted over the radio mesh network in number multiplied to N packets because the packet issued from one receiver and carrying the reception information may be relayed through the number N (here 7) of receivers constituting the radio mesh network.

Figure 5:
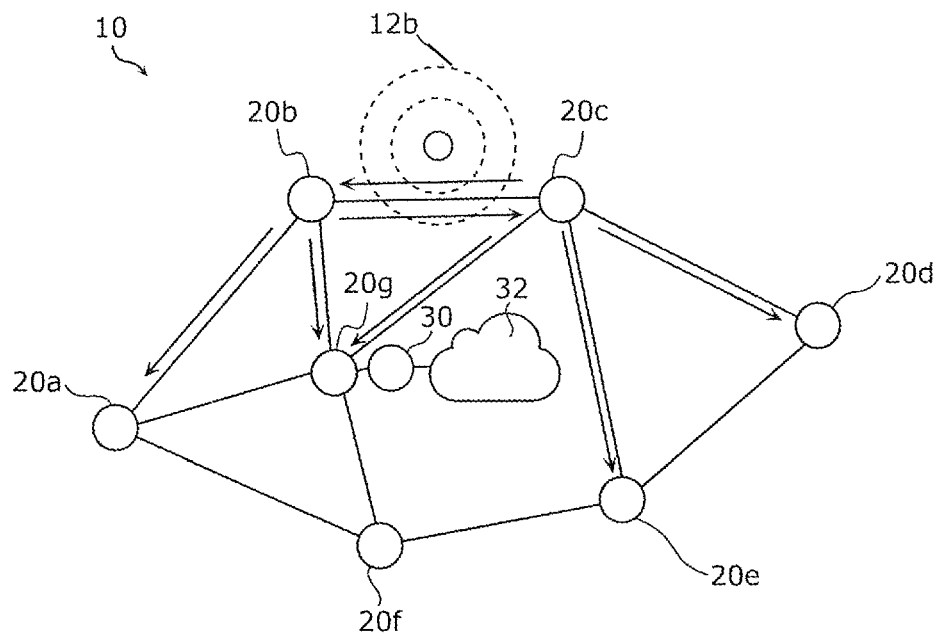
FIG. 5 illustrates a packet transmission example in the radio mesh network illustrated in FIG. 1.

When the beacon sent from one moving object (here moving object 12b) is received by the number M of receiver (here receivers 20b and 20c) as illustrated in FIG. 5, the number N×M of the packets may be transmitted over the radio mesh network.

Furthermore, when the number L (here 3) of the moving objects exist in the position detection system 10 and each moving object sends the beacon repeatedly at a frequency of once per second, the number L×M×N of the packets may be transmitted per second over the radio mesh network in the entire position detection system 10.

Thus, in the position detection system 10 according to the above embodiment, because numerous packets are transmitted over the radio mesh network depending on the number of receivers constituting the radio mesh network, the positions and the number of the moving objects, the frequency of sending the beacon from each moving object, and so on, the congestion of the packets carrying the reception information may occur.

In consideration of the above point, a modification of the above embodiment is described below as to a receiver (more specifically, control unit 24 in each of the receivers 20a to 20g), which is constituted by adding, to the receiver according to the above embodiment, the function of suppressing the congestion of the packets carrying the reception information transmitted over the radio mesh network. Whether to add the following additional function of the receiver may be determined in accordance with previous setting (e.g., a command applied to the receiver from an external device using a radio signal). Alternatively, the additional function may be made effective in optional combination of multiple additional functions.

Modification 1

In Modification 1, when the receiving unit 22 in each of the receivers 20a to 20g receives the beacon, the control unit 24 sends the first reception information after the lapse of a waiting time that is set to be longer as the received beacon has lower signal strength. However, the control unit 24 stops sending of the first reception information when the second reception information is received from the other receiver during the lapse of the waiting time after receiving the beacon.

Figure 6:
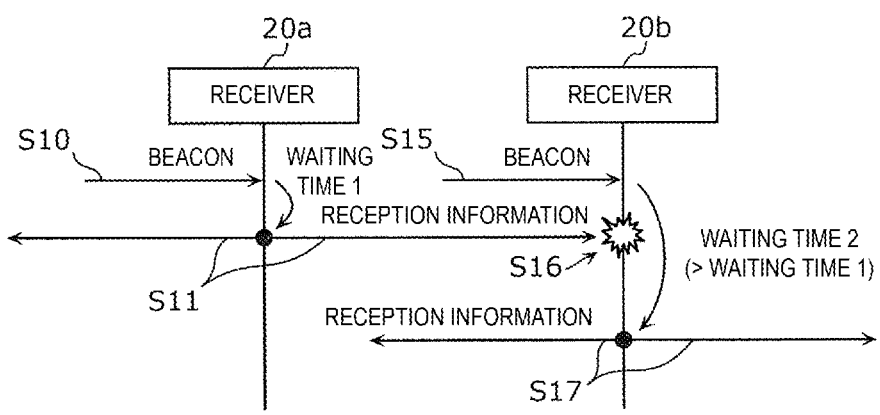
FIG. 6 is a communication sequence chart illustrating the operations of the receivers in Modification 1 of the embodiment.

FIG. 6 is a communication sequence chart illustrating the operations of the receivers in Modification 1. FIG. 6 illustrates the operations in the case of receiving the same beacon by two receivers 20a and 20b. It is assumed that the signal strength of the beacon received by the receiver 20a is higher than the signal strength of the beacon received by the receiver 20b.

In the receiver 20a, when the receiving unit 22 receives the beacon (S10), the control unit 24 determines, from the signal strength of the received beacon, a waiting time 1 corresponding to the signal strength by referring to a preset function or table, and waits for the predetermined waiting time 1.

In the above case, because the control unit 24 does not receive the reception information (second reception information) from the other receiver during the lapse of the waiting time 1 after receiving the beacon, it sends, from the sending unit 23, the reception information (first reception information) regarding the just received beacon after the lapse of the waiting time 1 (S11). The first reception information is generated until the waiting time 1 lapses after receiving the beacon.

On the other hand, in the receiver 20b, when the receiving unit 22 receives the same beacon as that received by the receiver 20a (S15), the control unit 24 determines, from the signal strength of the received beacon, a waiting time 2 corresponding to the signal strength by referring to the preset function or table, and waits for the predetermined waiting time 2. In this case, because the signal strength of the beacon received by the receiver 20b is lower than that of the beacon received by the receiver 20a, the waiting time 2 determined by the receiver 20b is longer than the waiting time 1 determined by the receiver 20a (i.e., waiting time 2>waiting time 1).

If the reception information (second reception information) from the other receiver is not received during the lapse of the waiting time 2 after receiving the beacon, the control unit 24 sends, from the sending unit 23, the reception information (first reception information) regarding the just received beacon (S17). In this case, however, because the reception information (second reception information) from the other receiver 20a is received during the lapse of the waiting time 2, which is longer than the waiting time 1, after receiving the beacon, the control unit 24 stops sending (S17) of the first reception information (S16). The control unit 24 sends (transfers), from the sending unit 23, the reception information (second reception information) received from the other receiver 20a.

Thus, according to Modification 1, the first reception information is successively sent from the receiver having received the beacon with the highest signal strength, while the receiver having received the beacon with lower signal strength stops sending of the first reception information because it receives the second reception information from the other receiver before sending the first reception information. As a result, the reception information related to the lower signal strength is avoided from being transmitted in the radio mesh network, and the congestion of the packets carrying the reception information in the radio mesh network is suppressed.

Modification 2

In Modification 2, on the premise of sending the first reception information during the waiting time as in above Modification 1, when the receiving unit 22 in each of the receivers 20a to 20g receives the beacon during the waiting time, the control unit 24 further compares the signal strength of the received beacon (signal strength of the beacon received by the relevant receiver being also called "first signal strength" hereinafter) with the signal strength indicated by information contained in the second reception information (the signal strength indicated by the information contained in the second reception information being also called "second signal strength" hereinafter), and stops sending of the first reception information if the second signal strength is higher than the first signal strength. A margin (offset) may be taken into consideration in the above comparison. For instance, the sending of the first reception information may be stopped if the second signal strength is higher than a value resulting from adding a predetermined offset to the first signal strength.

Figure 7:
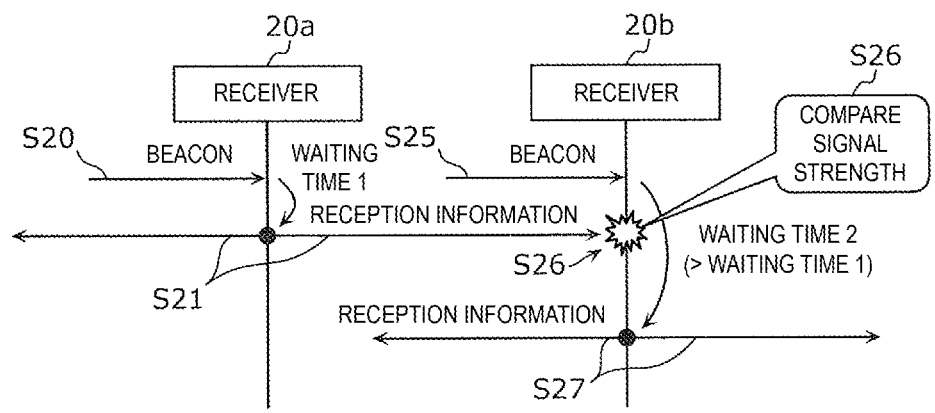
FIG. 7 is a communication sequence chart illustrating the operations of the receivers in Modification 2 of the embodiment.

FIG. 7 is a communication sequence chart illustrating the operations of the receivers in Modification 2. It is here assumed that there exist the same situations as those in Modification 1 illustrated in FIG. 6 (namely, that two receivers 20a and 20b receive the same beacon, and that the signal strength of the beacon received by the receiver 20a is higher than the signal strength of the beacon received by the receiver 20b).

Because the receiver 20a does not receive the second reception information during the waiting time 1, it operates in the same manner as in above Modification 1 (S20 and S21).

On the other hand, in the receiver 20b, when the receiving unit 22 receives the same beacon as that received by the receiver 20a (S25), the control unit 24 determines, from signal strength of the received beacon, a waiting time 2 (>waiting time 1) corresponding to the signal strength by referring to the preset function or table, and waits for the predetermined waiting time 2. If the reception information (second reception information) from the other receiver is not received during the lapse of the waiting time 2 after receiving the beacon, the control unit 24 sends, from the sending unit 23, the reception information (first reception information) regarding the just received beacon (S27). Those processes (S25 and S27) are the same as those in above Modification 1.

In this case, however, because the reception information (second reception information) from the other receiver 20a is received during the lapse of the waiting time 2, which is longer than the waiting time 1, after receiving the beacon, the control unit 24 compares the signal strength (first signal strength) of the beacon received in step S25 with the signal strength (second signal strength) indicated by the information contained in the second reception information received from the other receiver 20a (S26). In this case, the control unit 24 determines, as a result of the comparison, that the second signal strength is higher than the first signal strength, and hence stops the sending of the first reception information (S27). The control unit 24 sends (transfers), from the sending unit 23, the reception information (second reception information) received from the other receiver 20a.

Thus, according to Modification 2, when the second reception information is received from the other receiver, the sending of the first reception information is stopped depending on the result of comparing the signal strength of the beacon. Thus, even when there are variations among the processing times and the waiting times in the individual receivers, the reception information related to lower signal strength can be more reliably suppressed from being transmitted in the radio mesh network than in above Modification 1.

Modification 3

In Modification 3, each of the moving objects 12a to 12c sends the beacon containing a sequence number that is updated whenever it sends the beacon.

The control unit 24 in each of the receivers 20a to 20g operates basically in the same manner as that in above Modification 2. When sending the first reception information, however, the control unit 24 sends, from the sending unit 23, the first reception information to which the sequence number is added. Furthermore, when comparing the first signal strength and the second signal strength in above Modification 2, the control unit 24 compares the signal strengths of the beacons having the same sequence number.

Figure 8:
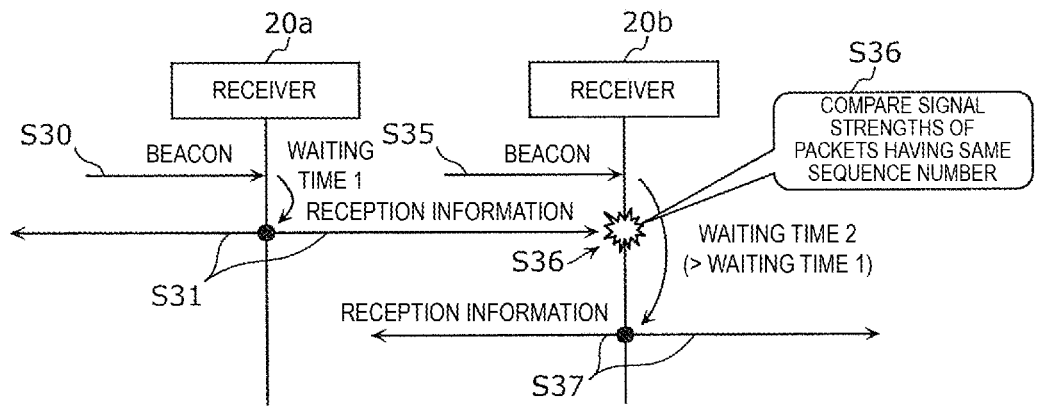
FIG. 8 is a communication sequence chart illustrating the operations of the receivers in Modification 3 of the embodiment.

FIG. 8 is a communication sequence chart illustrating the operations of the receivers according to Modification 3. It is here assumed that there exist the same situations as those in Modification 1 illustrated in FIG. 6 (namely, that two receivers 20a and 20b receive the same beacon, and that the signal strength of the beacon received by the receiver 20a is higher than the signal strength of the beacon received by the receiver 20b). In addition, the beacon is assigned with the sequence number (here "Seq#5") that is updated per beacon.

Because the receiver 20a does not receive the second reception information during the waiting time 1, it operates in the same manner as in above Modification 1 (S30 and S31). When sending the first reception information, however, the control unit 24 in the receiver 20a sends, from the sending unit 23, the first reception information to which the sequence number ("Seq#5") is added (S31).

On the other hand, in the receiver 20b, when the receiving unit 22 receives the same beacon (i.e., the beacon containing "Seq#5") as that (i.e., the beacon containing "Seq#5") received by the receiver 20a (S35), the control unit 24 determines, from the signal strength of the received beacon, a waiting time 2 (>waiting time 1) corresponding to the signal strength by referring to the preset function or table, and waits for the predetermined waiting time 2. If the reception information (second reception information) from the other receiver is not received during the lapse of the waiting time 2 after receiving the beacon, the control unit 24 sends, from the sending unit 23, the reception information (first reception information) regarding the just received beacon (S37). Those processes (S35 and S37) are the same as those in above Modification 1.

In this case, however, because the reception information (second reception information) from the other receiver 2a is received during the lapse of the waiting time 2, which is longer than the waiting time 1, after receiving the beacon, the control unit 24 confirms that the sequence number (here "Seq#5") contained in the beacon received in step S35 matches with the sequence number (here "Seq#5") contained in the second reception information received from the receiver 20a, and then executes the comparison between the first signal strength and the second signal strength as in Modification 2 for the beacons containing the same sequence number (S36). In this case, the control unit 24 determines, as a result of the comparison, that the second signal strength is higher than the first signal strength, and hence stops the sending of the first reception information (S37). The control unit 24 sends (transfers), from the sending unit 23, the reception information (second reception information) received from the other receiver 20a.

Thus, according to Modification 3, the comparison of the signal strength is performed for the beacon sent from the same moving object at the same timing. Therefore, even when a larger number of moving objects are present or a moving speed of the moving object is higher than in Modification 2, only the reception information related to higher signal strength is delivered to the server device 34 through the gateway device 30 per beacon sent from one moving object. Hence accurate position detection is realized.

Modification 4

In Modification 4, each of the moving objects 12a to 12c sends the beacon periodically.

The control unit 24 in each of the receivers 20a to 20g operates basically in the same manner as that in any of above Modifications 1 to 3. However, the control unit 24 determines the waiting time corresponding to the signal strength of the received beacon such that a maximum value of the waiting time is smaller than a period of the beacon sent from each of the moving objects 12a to 12c. Modification 4 is to give an additional function to any of above Modifications 1 to 3.

Figure 9:
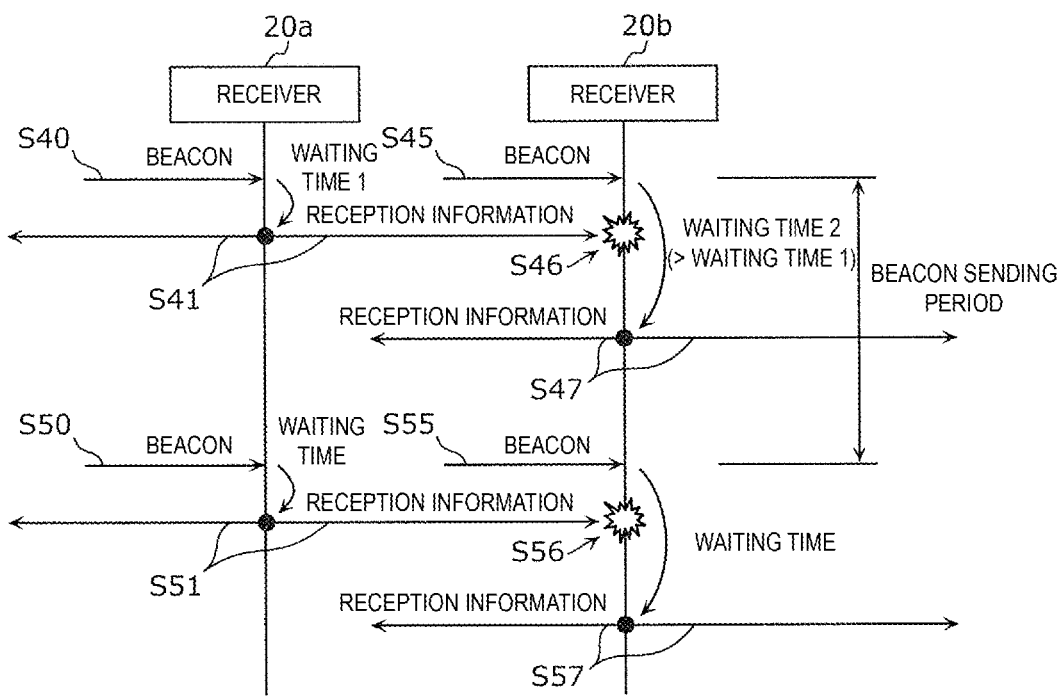
FIG. 9 is a communication sequence chart illustrating the operations of the receivers in Modification 4 of the embodiment.

FIG. 9 is a communication sequence chart illustrating the operations of the receivers according to Modification 4. FIG. 9 illustrates the communication sequence in which the same situations as those in Modification 3 illustrated in FIG. 8 (namely, that two receivers 20a and 20b receive the same beacon, and that the signal strength of the beacon received by the receiver 20a is higher than the signal strength of the beacon received by the receiver 20b) occur twice (for two sequence numbers "Seq#5" and "Seq#6").

The operations (S40, S41, S50, S51) of the receiver 20a and the operations (S45 to S47, S55 to S57) of the receiver 20b are basically similar to the operations of the receiver 20a and the operations of the receiver 20b in above Modifications 1 to 3, respectively.

In Modification 4, however, when the control unit 24 determines the waiting time from the signal strength of the beacon arriving at the receiving unit 22 in each of the receivers 20a and 20b, it determines the waiting time corresponding to the signal strength of the received beacon such that a maximum value of the waiting time is smaller than a period (sending interval) of the beacon sent from each of the moving objects 12a to 12c.

More specifically, a function or a table used for converting the signal strength of the beacon to the waiting time is prepared so as to provide the maximum value of the waiting time after the conversion, which is smaller than the beacon period. Alternatively, the control unit 24 multiplies the waiting time resulting from referring to a function or a table by a coefficient depending on the beacon period, thus correcting the waiting time such that a maximum value of the obtained waiting time is smaller than the beacon period.

Through the above processing, it is ensured, as seen from "WAITING TIME 2" in FIG. 9, that the waiting time determined in the receiver does not exceed the beacon period (here time interval between the beacon containing "Seq#5" and the beacon containing "Seq#6").

Thus, according to Modification 4, since the maximum value of the waiting time is smaller than the beacon sending period, the receiver is avoided from receiving the next beacon from the same moving object while it is in a waiting period until sending of the first reception information. As a result, the complication of the processing is avoided from occurring due to the fact that the determination regarding whether to send the first reception information for each of the plural beacons is accumulated in the waiting time.

Modification 5

In Modification 5, the control unit 24 in each of the receivers 20a to 20g operates basically in the same manner as that in above Modification 2 or 3. When comparing the first signal strength and the second signal strength, however, the control unit 24 compares the first signal strength and the second signal strength for each of a predetermined plural number (e.g., 2) of other receivers, and stops the sending of the first reception information if the second signal strength is higher than the first signal strength for all the predetermined plural number (e.g., 2) of other receivers. Otherwise, the control unit 24 sends the first reception information. The predetermined number of plural receivers, used in the above determination criteria, represents just a predetermined value, i.e., a plural number of unspecified receivers instead of specified receivers.

Figure 10:
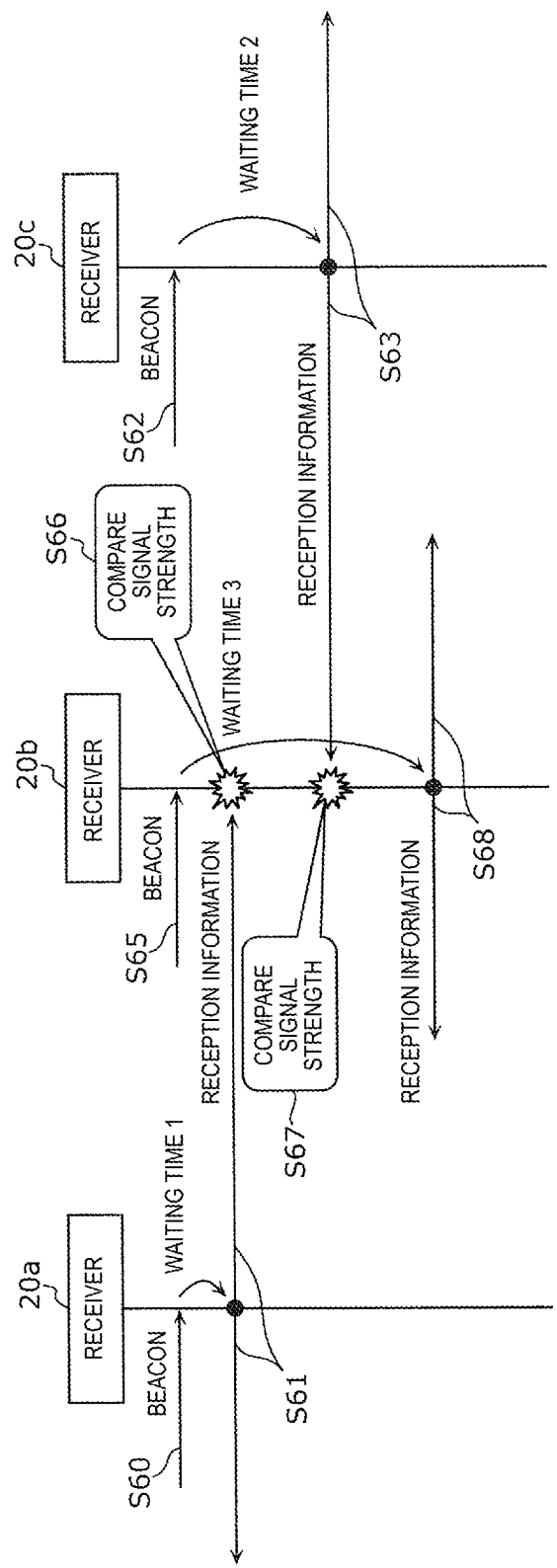
FIG. 10 is a communication sequence chart illustrating the operations of the receivers in Modification 5 of the embodiment.

FIG. 10 is a communication sequence chart illustrating the operations of the receivers according to Modification 5. FIG. 10 illustrates the communication sequence including not only the same situations as those in Modification 2 illustrated in FIG. 7 (namely, that two receivers 20a and 20b receive the same beacon, and that the signal strength of the beacon received by the receiver 20a is higher than the signal strength of the beacon received by the receiver 20b), but also the case that the receiver 20c further receives the same beacon.

In other words, the receiver 20c receives the same beacon as that received by the receivers 20a and 20b. It is here assumed that the signal strength of the beacon received by the receiver 20c is lower than that of the beacon received by the receiver 20a and higher than that of the beacon received by the receiver 20b.

The operations of the receivers 20a and 20c are similar to those of the receiver 20a in above Modification 2. More specifically, in the receiver 20a, when the receiving unit 22 receives the beacon (S60), the control unit 24 waits for the waiting time 1 corresponding to the signal strength of the received beacon, and then sends, from the sending unit 23, the reception information (first reception information) regarding the received beacon (S61). Similarly, in the receiver 20c, when the receiving unit 22 receives the beacon (S62), the control unit 24 waits for the waiting time 2 corresponding to the signal strength of the received beacon, and then sends, from the sending unit 23, the reception information (first reception information) regarding the received beacon (S63).

On the other hand, in the receiver 20b, when the receiving unit 22 receives the beacon (S65), the control unit 24 waits for a waiting time 3 corresponding to the signal strength of the received beacon. Here, because the signal strength of the beacon received by the receiver 20b is lower than that of the beacon received by any of the receivers 20a and 20c, the waiting time 3 determined in the receiver 20b is longer than any of the waiting time 1 determined in the receiver 20a and the waiting time 2 determined in the receiver 20c (i.e., waiting time 3>waiting time 2>waiting time 1).

Accordingly, the control unit 24 receives the reception information (second reception information) from each of the predetermined plural number of other receivers 20a and 20b during the lapse of the waiting time 3 after receiving the beacon (S66 and S67). Regarding the reception information received from each of the receivers 20a and 20c, the control unit 24 compares the first signal strength related to the relevant receiver and the second signal strength related to the other receiver. In this case, the second signal strength is higher than the first signal strength in the reception information from each of the receivers 20a and 20c. Therefore, the control unit 24 determines, for all the predetermined plural number (e.g., 2) of other receivers, that the second signal strength is higher than the first signal strength, and then stops the sending of the first reception information (S68). If the control unit 24 does not determine, for all the predetermined plural number (e.g., 2) of other receivers, that the second signal strength is higher than the first signal strength, namely if the reception information from which the second signal strength can be determined to be higher than the first signal strength is not received from the predetermined plural number (e.g., 2) of other receivers during the waiting time 3, the control unit 24 sends the first reception information from the sending unit 23 (S68).

Stated in another way, the above-described determination criteria in the receiver 20b are equivalent to the following. In the receiver 20b, when receiving the second reception information from the plurality (e.g., 5) of other receivers, the control unit 24 stops the sending of the first reception information (S68) if the first signal strength related to the reception by the relevant receiver does not fall within a predetermined order (e.g., top two), and sends the first reception information from the sending unit 23 (S68) if the first signal strength related to the reception by the relevant receiver falls within the predetermined order (e.g., top two). The "predetermined plural number" in the above-described example corresponds to the "predetermined order" herein. Thus, when the second reception information is received from the plurality of other receivers, the control unit 24 stops the sending of the first reception information if, in an assembly of the signal strengths including the first signal strength and the second signal strength contained in the second reception information received from each of the plurality of other receivers, the first signal strength does not fall within the predetermined order from maximum signal strength.

Thus, according to Modification 5, since the sending of the reception information related to the relevant receiver is suppressed if the signal strengths contained in the reception information received from the plurality of other receivers are higher than the signal strength related to the relevant receiver, only the reception information sent from the plurality of receivers having received the beacons with the signal strengths higher than a certain level are delivered to the server device 34. Therefore, the server device 34 can perform the position detection using the reception information delivered from a predetermined plural number of receivers (by a sophisticated method such as three-point positioning).

Modification 6

In Modifications 1 to 5, the packet congestion is suppressed by, when the receiver receives the beacon, sending or not sending the first reception information after waiting for the waiting time corresponding to the signal strength of the beacon. In Modification 6, the packet congestion is suppressed by estimating the signal strength of the beacon received by the other receiver instead of setting the waiting time, and by determining on the basis of the estimated signal strength whether the first reception information is to be sent.

More specifically, the control unit 24 in each of the receivers 20a to 20g estimates, from the reception information (second reception information) received from any other receiver before, the signal strength of the beacon to be next received by the other receiver (signal strength of the beacon to be next received by the other receiver, which is estimated on the basis of signal strengths related to the past reception by the other receiver, is also called "third signal strength" hereinafter). Then, the control unit 24 compares the estimated third signal strength with the signal strength (first signal strength) of the beacon received by the receiving unit 22, and stops the sending of the first reception information if the third signal strength is higher than the first signal strength.

The above-described estimation can be practically performed, for example, by a method of obtaining, as the estimated third signal strength, a value resulting from increasing or decreasing the signal strength of the latest beacon by a predetermined value or rate, or a method of calculating an approximation curve fitting to the signal strengths of a plurality of past beacons, and obtaining, as the estimated third signal strength, a value resulting from the extrapolation based on the calculated curve.

Figure 11:
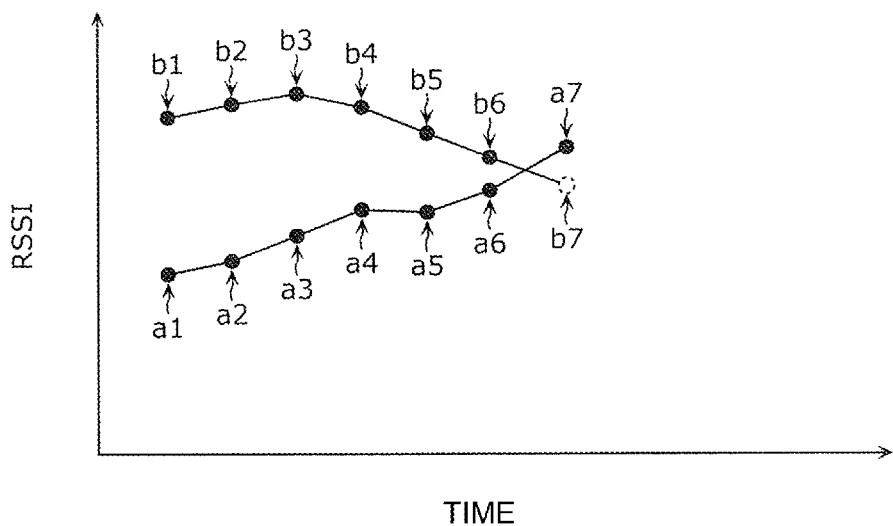
FIG. 11 is a communication sequence chart illustrating the operations of the receivers in Modification 6 of the embodiment.

FIG. 11 is a chart referenced to explain the operations of the receivers according to Modification 6. FIG. 11 illustrates the time-dependent changes in not only the signal strengths of beacons a1 to a7 received by the relevant receiver (e.g., receiver 20a), but also the signal strengths of beacons b1 to b6 received by the other receiver (e.g., receiver 20b) and the signal strength of a beacon b7 estimated for the other receiver (e.g., receiver 20b) (horizontal axis denoting the time and vertical axis denoting the signal strength of the beacon (i.e., RSSI)).

In the example illustrated in FIG. 11, for the first to sixth beacons a1 to a6, the control unit 24 in the receiver 20a receives the reception information (second reception information) from the receiver 20b substantially at the same time as when the receiving unit 22 receives the beacon (more exactly, within a predetermined time). In the cases of receiving those beacons, therefore, the control unit 24 compares the signal strength (first signal strength) of the beacon received by the relevant receiver with the signal strength (second signal strength) indicated by the information contained in the reception information (second reception information) received from the receiver 20b, and stops the sending of the first reception information because it determines that the second signal strength is higher than the first signal strength.

On the other hand, for the seventh beacon a7, because the control unit 24 in the receiver 20a does not receive the reception information (second reception information) from the receiver 20b substantially at the same time as when the receiving unit 22 receives the beacon a7 (more exactly, within the predetermined time), the control unit 24 estimates the signal strength (third signal strength) of the imaginary beacon b7, which is expected to be next received by the receiver 20b, from the reception information (second reception information) received from the receiver 20b before. In this case, the third signal strength is calculated through the extrapolation using a plurality of past beacons (e.g., beacons b5 and b6), and it is a value smaller than the signal strength (first signal strength) of the beacon a7. Then, the control unit 24 compares the estimated third signal strength with the first signal strength related to the relevant receiver, and sends the first reception information from the sending unit 23 because it determines that the third signal strength is not higher than the first signal strength.

Thus, according to Modification 6, in each of the receivers 20a to 20g, whether to send the reception information can be determined by comparing the estimated signal strength related to the other receiver with the signal strength related to the relevant receiver without setting the waiting time. Accordingly, the reception information from each of the receivers 20a to 20g is delivered to the server device in a shorter time after sending of the beacon from each of the moving objects 12a to 12c. It is hence possible to not only suppress the congestion of the packets carrying the reception information, but also reduce the latency in the position detection and update.

Each of FIGS. 12A and 12B illustrates an example in which the packet congestion is reduced in the position detection system 10 according to Modification 6. A chart of FIG. 12A illustrates the time-dependent changes in the actual signal strength (RSSI) when four receivers (here nodes A to D) constituting the position detection system 10, which represents an experimental example, receive the beacon sent from one moving object. A chart of FIG. 12B illustrates a result of specifying, by simulation, the packets transmitted over the radio mesh network when the four receivers (here nodes A to D) execute the processing according to Modification 6, and of plotting those packets.

In the simulation, each of the receivers calculates, as the third signal strength, a value that is −6 dB smaller than a maximum value among signal strengths indicated by all data of the reception information received just before, and stops the sending of the first reception information if the calculated third signal strength is higher than the first signal strength related to the relevant receiver.

As seen from FIG. 12B, the sending of the packets carrying the reception information with low signal strength (RSSI) is suppressed, and the packet congestion in the radio mesh network is reduced. The packets carrying the reception information with high signal strength (RSSI) are transmitted in the radio mesh network without being suppressed, and hence there are no adverse influences on the position detection of the moving object.

Modification 7

In Modification 7, on the premise that each receiver has the function of estimating the signal strength of the beacon received by the other receiver as in above Modification 6, the control unit 24 in each of the receivers 20a to 20g estimates, from the signal strength (third signal strength) estimated before for any other receiver, the signal strength of the beacon to be next received by the other receiver (signal strength of the beacon to be next received by the other receiver, which is estimated on the basis of the third signal strength estimated for the other receiver, is also called "fourth signal strength" hereinafter). Then, the control unit 24 compares the estimated fourth signal strength with the first signal strength related to the relevant receiver, and stops the sending of the first reception information if the fourth signal strength is higher than the first signal strength.

A practical method of estimating the fourth signal strength is basically similar to that used in estimating the third signal strength in above Modification 6. More specifically, the estimation can be performed, for example, by a method of obtaining, as the estimated fourth signal strength, a value resulting from increasing or decreasing the signal strength of the latest beacon (including an actual value and an estimated value) by a predetermined value or rate, or a method of calculating an approximation curve fitting to signal strengths of a plurality of past beacons, and obtaining, as the estimated fourth signal strength, a value resulting from extrapolation based on the calculated curve.

FIG. 13 is a chart referenced to explain the operations of the receivers according to Modification 7. FIG. 13 illustrates the time-dependent changes in not only the signal strengths of beacons a1 to a9 received by the relevant receiver (e.g., receiver 20a), but also the signal strengths of beacons b1, b2 and b5 to b9 received by the other receiver (e.g., receiver 20b) and the signal strengths of beacons b3 and b4 estimated for the other receiver (e.g., receiver 20b) (horizontal axis denoting time and vertical axis denoting signal strength of the beacon (i.e., RSSI)).

In the example illustrated in FIG. 13, for the first and second beacons a1 and a2, the control unit 24 in the receiver 20a receives the reception information (second reception information) from the receiver 20b substantially at the same time as when the receiving unit 22 receives the beacon (more exactly, within a predetermined time). In the cases of receiving those beacons, therefore, the control unit 24 compares the signal strength (first signal strength) of the beacon received by the relevant receiver with the signal strength (second signal strength) indicated by the information contained in the reception information (second reception information) received from the receiver 20b, and stops the sending of the first reception information because it determines that the second signal strength is higher than the first signal strength.

On the other hand, for the third beacon a3, because the control unit 24 in the receiver 20a does not receive the reception information (second reception information) from the receiver 20b substantially at the same time as when the receiving unit 22 receives the beacon a3 (more exactly, within the predetermined time), the control unit 24 estimates the signal strength (third signal strength) of the imaginary beacon b3, which is expected to be next received by the receiver 20b, in a similar manner to that in Modification 6. In this case, the control unit 24 compares the estimated third signal strength with the first signal strength related to the relevant receiver, and stops the sending of the first reception information because of determining that the third signal strength is higher than the first signal strength.

Furthermore, for the fourth beacon a4, because the control unit 24 in the receiver 20a does not receive the reception information (second reception information) from the receiver 20b substantially at the same time as when the receiving unit 22 receives the beacon a4 (more exactly, within the predetermined time), the control unit 24 estimates the signal strength of the imaginary beacon b4 (i.e., signal strength of fourth signal strength), which is expected to be next received by the receiver 20b, from the third signal strength estimated before (i.e., the signal strength of the imaginary beacon b3). In this case, the control unit 24 compares the estimated fourth signal strength with the first signal strength related to the relevant receiver, and stops the sending of the first reception information because it determines that the fourth signal strength is higher than the first signal strength.

For the fifth and subsequent beacons a5 to a9, the control unit 24 in the receiver 20a receives the reception information (second reception information) from the receiver 20b substantially at the same time as when the receiving unit 22 receives the beacon (more exactly, within the predetermined time). In the cases of receiving those beacons, therefore, the control unit 24 compares the signal strength (first signal strength) of the beacon received by the relevant receiver with the signal strength (second signal strength) indicated by the information contained in the reception information (second reception information) received from the receiver 20b, and stops the sending of the first reception information (for the beacons a5 and a6) or sends the first reception information from the sending unit 23 (for the beacons a7 to a9) depending on the comparison result.

Thus, according to Modification 7, regarding the signal strength in the other receiver, successively estimated signal strength is further estimated on the basis of the estimated signal strength. As a result, in each receiver, whether to send the first reception information can be properly determined even when the reception information cannot be received from the other receiver for some reason such as radio wave interference.

Modification 8

In Modification 8, on the premise that each receiver has the function of estimating the signal strength of the beacon received by the other receiver as in above Modification 6 or 7, the control unit 24 in each of the receivers 20a to 20g executes the estimation of the signal strength by estimating the signal strength to be lower than the latest signal strength (actual signal strength or estimated signal strength).

The above estimation can be practically performed, for example, by a method of obtaining, as the estimated signal strength, a value resulting from decreasing the signal strength (actual signal strength or estimated signal strength) of the latest beacon by a predetermined value or rate.

FIG. 14 is a chart referenced to explain the operations of the receivers according to Modification 8. FIG. 14 illustrates the time-dependent changes in not only the signal strengths of beacons a1 to a9 received by the relevant receiver (e.g., receiver 20a), but also the signal strengths of beacons b1 to b4 received by the other receiver (e.g., receiver 20b) and the signal strengths of beacons b5 to b7 estimated for the other receiver (e.g., receiver 20b) (horizontal axis denoting time and vertical axis denoting signal strength of the beacon (i.e., RSSI)).

As illustrated in FIG. 14, the estimated signal strength of each of the beacons b5 to b7 has a smaller value than the latest signal strength.

Thus, according to Modification 8, for the other receiver, the signal strength is estimated to be lower than the latest signal strength. It is hence possible to avoid a situation that the sending of the first reception information is continuously stopped because high signal strength is estimated in spite of the other receiver not receiving the beacon.

While the position detection system and the receiver according to the present disclosure have been described above in connection with the embodiments and Modifications, the present disclosure is not limited to those embodiments and Modifications. Other modifications obtained by variously modifying the above embodiments and Modifications based on ideas conceivable by those skilled in the art, and other forms constituted by optionally combining parts of constituent elements in the above embodiments and Modifications are also included in the scope of the present disclosure insofar as not departing from the gist of the present disclosure.

For instance, while, in the above embodiments and Modifications, the receivers 20a to 20g constituting the position detection system 10 are the fixed stations mounted to the walls of the rooms, the present disclosure is not limited to that case, and the receivers 20a to 20g may be mobile stations. When the receivers 20a to 20g are mobile, the receivers 20a to 20g preferably inform their current positions to the server device 34 each time when the receivers move. As a result, the server device 34 can detect the positions of the moving objects 12a to 12c in consideration of the positions of the moving receivers 20a to 20g.

While, in the above embodiments and Modifications, all the receivers 20a to 20g have the same function, the present disclosure is not limited to that case, and the position detection system may include different receivers corresponding to the different forms of the above embodiments and Modifications. Even in the position detection system constituted by receivers having different functions, since each of the receivers 20a to 20g has at least the function as the receiver in the above embodiments (i.e., the receiver constituting the radio mesh network), the position detection system can be realized in which a drawback such as the complication in laying communication cables is suppressed, and in which the system extension is easy to carry out.

While, in the above embodiments and Modifications, the receivers 20a to 20g function as nodes constituting the position detection system 10, they may have, in addition to the node function, the repeater function for a packet regarding another information not related to the position detection (such as information given to one receiver from an external communication device).

While, in the above embodiments and Modifications, the position detection system 10 includes the gateway device 30, the gateway device 30 is not limited to a device generally called a "gateway device", and it may be any type of device insofar as the device serves as a communication interface interconnecting the receiver 20g and the server 34.

While, in the above embodiments and Modifications, the server device 34 is disposed outside the position detection system 10, the server device 34 is not limited to such an installation layout, and it may be disposed inside the position detection system 10. For instance, any of the receivers 20a to 20g has the function as the server device 34 (i.e., the function of specifying the position of the moving object from the collected reception information).

The present disclosure can be utilized as a position detection system for detecting a position of a moving object, and as a receiver constituting the position detection system. For instance, the present disclosure can be utilized as a position detection system constituting asset tracking that is used in distribution management and material management.

10 position detection system
12a to 12c moving object
20a to 20g receiver
21 antenna
22 receiving unit
23 sending unit
24 control unit
30 gateway device
32 communication network
34 server device

The invention claimed is:

1. A position detection system that sends, to a server, information for detecting a position of a moving object that repeatedly sends a beacon signal, the position detection system comprising:
   a plurality of receivers constituting a radio mesh network; and
   a gateway connected to one of the plurality of receivers and configured to communicate with the server, wherein:
   each receiver comprises:
      a radio receiver configured to receive the beacon signal and a radio signal sent from another receiver;
      a radio transmitter configured to send a radio signal report to the other receivers; and
      a controller configured to control the radio receiver and the radio transmitter,
   when the radio receiver of a first receiver not connected to the gateway receives the beacon signal, the controller of the first receiver is configured to generate a first radio signal report comprising information indicating a first signal strength of the received beacon signal and identification information of the first receiver, and to control the radio transmitter of the first receiver to send the first radio signal report, and
   when the radio receiver of the first receiver receives a second radio signal report from a second receiver, the second radio signal report comprising information indicating a second signal strength of the beacon signal received by the second receiver and identification information of the second receiver, the controller of the first receiver is configured to send the second radio signal report from the radio transmitter of the first receiver,
   when a third receiver connected to the gateway receives the second radio signal report, the third receiver is configured to send the second radio signal report to the server through the gateway, and when the first receiver does not receive the second radio signal report from the second receiver within a predetermined time, the controller of the first receiver is configured to:
  estimate, based on signal strengths of previous radio signal reports received from the second receiver, a third signal strength of a beacon signal to be next received by the second receiver,
  compare the estimated third signal strength of the second receiver with the first signal strength of the beacon signal received by the radio receiver of the first receiver, and
  stop sending the first radio signal report if the estimated third signal strength of the second receiver is greater than the first signal strength of the first receiver.

2. The position detection system according to claim 1, wherein the controller of the first receiver is configured to:
  estimate, from the third signal strength, a fourth signal strength of the beacon signal to be next received by the second receiver,
  compare the estimated fourth signal strength with the first signal strength, and
  stop sending the first radio signal report if the fourth signal strength is greater than the first signal strength.

3. The position detection system according to claim 2, wherein, when estimating the third signal strength, the third signal strength is estimated to be lower than a signal strength of a most recently received beacon signal of the second receiver.

4. The position detection system according to claim 2, wherein when the radio receiver of the third receiver receives the beacon signal, the controller of the third receiver is configured to generate a radio signal report comprising information that contains information indicating signal strength of the received beacon signal and identification information of the third receiver, and to send the generated radio signal report from the radio transmitter.

5. The position detection system according to claim 1, wherein, when estimating the third signal strength, the third signal strength is estimated to be greater than a signal strength of a most recently received beacon signal of the second receiver.

6. The position detection system according to claim 5, wherein when the radio receiver of the third receiver receives the beacon signal, the controller of the third receiver is configured to generate a radio signal report comprising information that contains information indicating signal strength of the received beacon signal and identification information of the third receiver, and to send the generated radio signal report from the radio transmitter.

7. The position detection system according to claim 1, wherein when the radio receiver of the third receiver receives the beacon signal, the controller of the third receiver is configured to generate a radio signal report comprising information that contains information indicating signal strength of the received beacon signal and identification information of the third receiver, and to send the generated radio signal report from the radio transmitter.

8. The position detection system according to claim 1, wherein the controller of the first receiver is configured to stop sending the second radio signal report from the radio transmitter of the first receiver when the second signal strength is lower than the first signal strength.

9. The position detection system according to claim 8, wherein a controller of a receiver that measures a weaker signal strength of the beacon signal than a signal strength detected by another receiver is configured to increase a waiting time to receive a next radio signal report.

10. A position detection system that sends, to a server, information for detecting a position of a moving object that repeatedly sends a beacon signal, the position detection system comprising:
  a first receiver and a second receiver constituting a radio mesh network,
  each of the first receiver and the second receiver comprising:
    a radio receiver configured to receive the beacon signal and a radio signal report sent from the other receiver;
    a radio transmitter configured to send a radio signal report to the other receiver; and
    a controller configured to control the radio receiver and the radio transmitter, wherein:
  when the radio receiver of the first receiver receives the beacon signal, the controller of the first receiver is configured to:
    generate a first radio signal report comprising information indicating a first signal strength of the received beacon signal and identification information of the first receiver, and
    send the first radio signal report from the radio transmitter,
  when the radio receiver of the first receiver receives a second radio signal report comprising information indicating second signal strength of the beacon signal received by the second receiver and identification information of the second receiver, the controller of the first receiver is configured to send the second radio signal report from the radio transmitter, and
  when the first receiver does not receive the second radio signal report within a predetermined time, the controller of the first receiver is configured to
    estimate, based on an earlier received radio signal report from the second receiver, a second signal strength of the second signal to be next received by the second receiver,
    compare the estimated second signal strength of the second receiver to the first signal strength, and
    stop sending the first radio signal report if the estimated second signal strength of the second receiver is greater than the first signal strength of the first receiver.

11. The position detection system according to claim 10, wherein the controller of the first receiver is configured to stop sending the second radio signal report from the radio transmitter of the first receiver when the second signal strength is lower than the first signal strength.

12. The position detection system according to claim 11, wherein a controller of a receiver that measures a weaker signal strength of the beacon signal than a signal strength detected by another receiver is configured to increase a waiting time to receive a next radio signal report.

* * * * *